April 24, 1951          T. E. McAVOY          2,550,282
FISHING TROLLEY LINE SIGNAL AND WEIGHT INDICATOR
Filed May 25, 1948          2 Sheets-Sheet 1
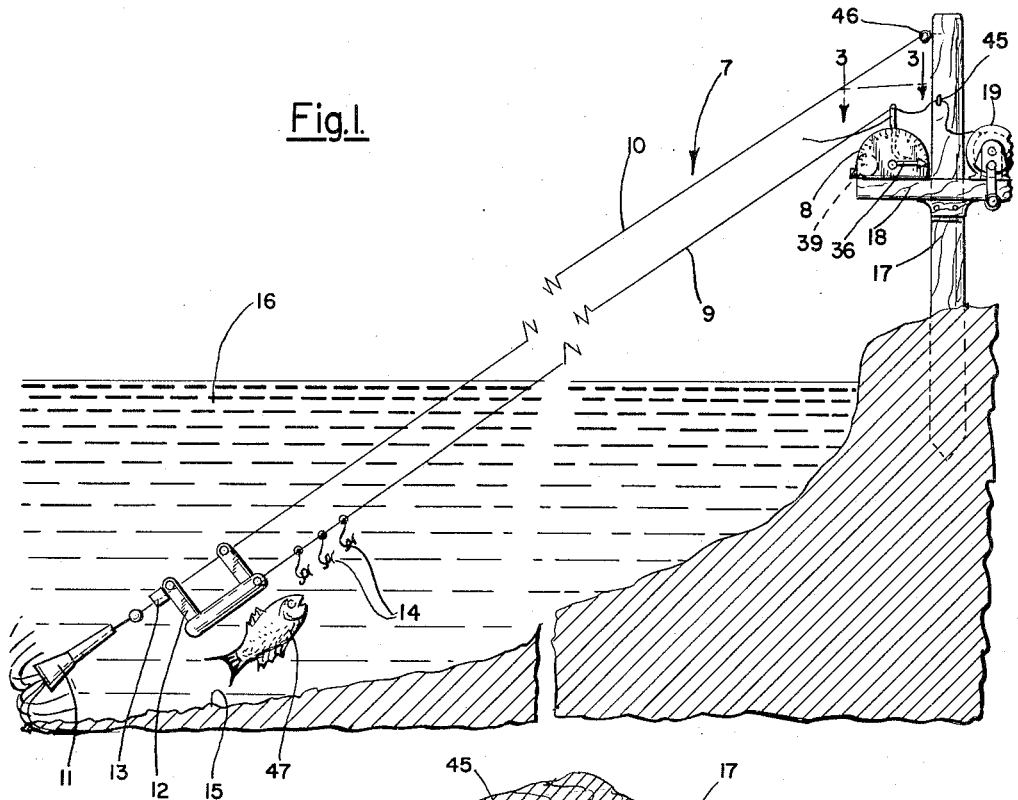
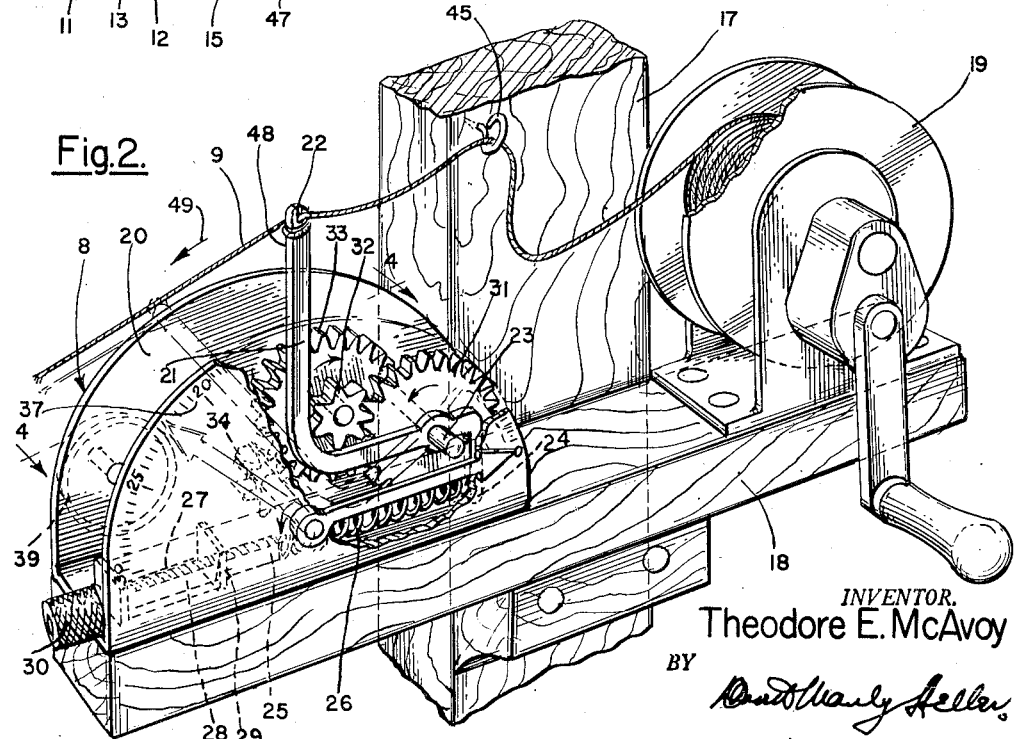
INVENTOR.
Theodore E. McAvoy
BY
ATTORNEY April 24, 1951 — T. E. McAVOY — 2,550,282
FISHING TROLLEY LINE SIGNAL AND WEIGHT INDICATOR
Filed May 25, 1948 — 2 Sheets-Sheet 2

*INVENTOR.*
Theodore E. McAvoy
BY
David Manly Heller
ATTORNEY

Patented Apr. 24, 1951

2,550,282

UNITED STATES PATENT OFFICE 2,550,282

FISHING TROLLEY LINE SIGNAL AND WEIGHT INDICATOR

Theodore E. McAvoy, Chicago, Ill.

Application May 25, 1948, Serial No. 29,044

4 Claims. (Cl. 43—17)

My invention relates to trolley line fishing means and bears particular relation to providing means for automatically signalling and weighing of the hooked fish.

An important object of my invention is to provide a fish trolley line signal and weight indicator which, when actuated by the jerk and pull on the fish line by a fish hooked thereon, will cause an audible signal and will, by means of pointer and calibrated dial means, indicate the weight of the hooked fish.

A further object of my invention is to provide a suitably mounted reel means for reeling in the hooked fish.

A still further object of my invention is to provide in the said audible signal means a freely rotating hammer element that, when actuated by the pull of the hooked fish, will strike a sounding means such as a bell to provide an audible signal.

A further object of my invention is to provide suitable adjusting means for the weighing spring so that the weight indicating pointer may be maintained at a proper normal setting such as "zero" on the calibrated dial.

A further object of my invention is to provide trolley and trolley line means for the purpose of maintaining the said fish line in a suitable location in the body of water used for fishing.

A further object of my invention is to provide fish trolley line signal and weight indicator means of simple design that may be economically manufactured in large quantities.

Other objects and advantages embraced in my invention will be disclosed in the following description and in the accompanying illustrations in which like parts are designated by like numerals, and in which:

Fig. 1 is an elevational view of my invention shown properly mounted in connection with a body of water for the purpose of fishing.

Fig. 2 is a perspective view of the fish signal and weight indicator means comprising a part of my invention, with parts cut away to show its operation.

Figure 3:
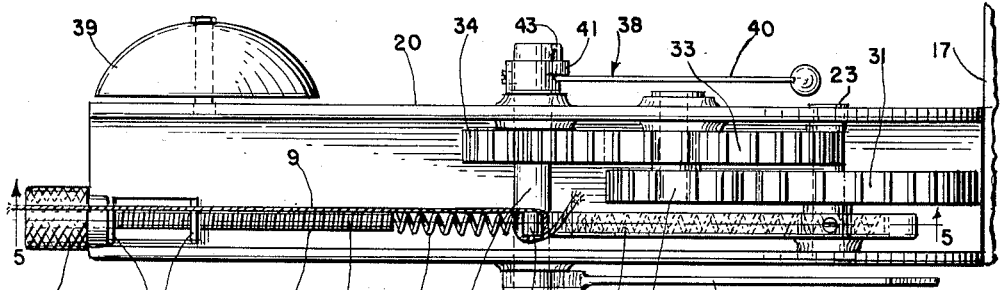
Fig. 3 is a top view of my invention taken substantially on line 3—3 on Fig. 1.

Referring to the illustrations, my invention is generally designated 7, and consists of a fish signal and weight indicator means 8, fish line means 9, a trolley line element 10, anchor means 11, and trolley means 12. The said fish signal and weight indicator means 8 together with reel means 19 are mounted on a cross bar 18 attached to a supporting mast 17. The said supporting mast 17 is firmly anchored along the edge or bank of a body of water designated 16. One end of the trolley line element 10 is attached at 46 to the supporting mast 17, as shown in Fig. 1. The other end of the said trolley line element 10 is attached to anchor means 11, which, in operation, will be moored firmly in the bed 15 of the said body of water 16, causing the trolley line element 10, to be stretched tautly so that trolley means 12 may freely ride thereon and be held in place by trolley stop 13.

Multiple fish hook means 14 are mounted on fish line means 9, near the end of which is attached the said trolley means 12, as shown in Fig. 1. The said fish line means 9 is secured in slot 22 in the line attaching end 48 of bell crank trip means 21. The said bell crank means 21 is rotatably mounted on bell crank mounting pin 23 between the sides of the signal and weight indicator housing 20, as best shown in Fig. 2.

Figure 5:
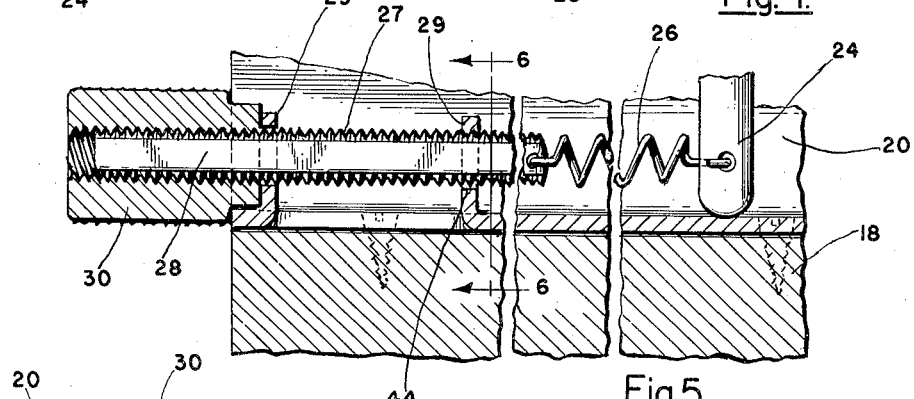
Fig. 5 is an enlarged fragmentary cross-sectional view of my invention taken substantially on line 5—5 on Fig. 3.
Figure 6:
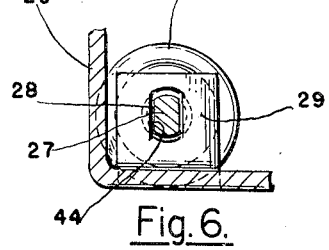
Fig. 6 is a fragmentary cross-sectional view of my invention taken substantially on line 6—6 on Fig. 5.

Bellcrank stop portion 24 rests upon the bottom of the signal and weight indicator housing 20 and is maintained in position by the tension spring 26 secured between the said bell crank stop portion 24 and the free end of adjusting screw means 27. The said adjusting screw means 27 is held in a non-rotatable position by means of flats 28 thereon, which communicates slidably through the screw guiding slots 44 in screw retaining portions 29. A knurled adjusting nut 30 provides means of adjusting the tension of the said tension spring 26 to maintain the said bell crank trip stop portion 24 normally in contact with the bottom of signal and weight indicator housing 20, as best shown in Fig. 5.

The bell crank mounting pin 23 is inter-connected through compound gearing pinions 31, 32, 33, and 34 with a weight indicator mounting pin 35.

Figure 4:
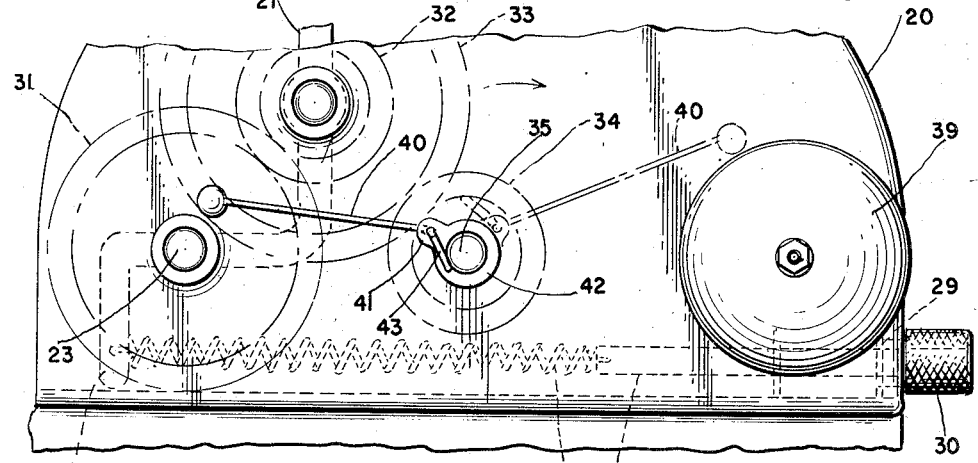
Fig. 4 is a side view of my invention taken looking in the direction of lines 4—4 on Fig. 2.

One side of the signal and weight indicator housing 20 is provided with a weight calibrated dial 37 upon which an indicating pointer 36 rotates. The said indicating pointer 36 is mounted upon weight indicator mounting pin 35 upon the other end of which a hammer mounting collar 42 is secured. A hammer mounting lug 41 located on hammer mounting collar 42 provides bearing for the bent end 43 of a hammer element 40. The said bent end 43 of hammer element 40 rests in normal position against the end portion of weight indicator mounting pin 35, as best illustrated in Figs. 3 and 4. Thus it will be seen that a partial rotation of the weight indicator mounting pin 35 will cause hammer element 40 to swing in the arc illustrated and strike the bell 39, mounted upon the outside of the signal and weight indicator housing 20.

To use my fish trolley line signal and weight indicator, one end of the trolley line 10 is secured near the top of the supporting mast 17, as shown in Fig. 1, with the other end attached to anchor means 11, which is firmly moored in the bed 15 of a body of water 16.

One end of fish line means 9 is secured to trolley means 12, which rides upon the taut trolley line element 10. The said trolley means 12 is weighted to maintain the end of the said fish line 9 at the trolley stop 13. Fish line means 9, from which the slack has been taken up, is secured through slot 22, in the line-attaching end 48 of bell crank means 21. The said fish line means 9 is threaded through line guiding eyelet 45 on supporting mast 17 and wound on reel means 19.

When a fish, which is illustrated in Fig. 1 and designated 47, becomes hooked upon one of the multiple hook means 14, a pull is consequently exerted on fish line 9, causing bell crank means 21 to be rotated in the direction of arrow 49 as shown in Fig. 2. The said rotational movement of bell crank means 21, together with bell crank mounting pin 23 is transferred through the said compound gearing pinions 31, 32, 33 and 34 to weight indicator mounting pin 35, causing the indicator pointer 36 to rotate along weight calibrated dial 37 and indicate the approximately correct weight of the hooked fish. Simultaneously the said hammer element 40 mounted upon the opposite end of weight indicator mounting pin 35 is actuated and caused to strike an audible signal means 38, such as a bell, as shown. Upon hearing the audible signal the fisherman disengages fish line means 9 from bell crank attaching end 48 which permits the fish to be reeled in by reel means 19 and trolley means 12.

When the said fish line means 9 has been disengaged from bell crank attaching end 48, the bell crank means 21, together with the indicating pointer 36, resume their normal position, as shown by solid lines in Fig. 2.

Since the length of the moored trolley line element, together with other factors, cause, or may cause, a variance in the weight or tension upon tension spring 26, therefore, adjusting screw means 27, together with a knurled adjusting nut 30 are provided for tightening or loosening the said tension spring 26 as required to maintain indicating pointer 36 at "zero" on calibrated dial 37 in normal operation.

A line guiding eyelet 45 is set into the supporting mast 17 at a point high enough above the fish signal and weight indicator means to insure a free moving fish line 9 while reeling in the fish.

My invention is of particular advantage to fishermen who do not wish to constantly watch their fish lines. A further advantage is its weighing indicating feature whereby the fisherman may know the weight or approximate weight of the fish as soon as it is hooked.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. In trolley line fishing means including fishing line means, a fish signal and weight indicator means comprising, a signal and weight indicator housing having a weight calibrated dial, a weight indicating pointer rotatably mounted to operate associatively with the said calibrated dial, bell-crank means mounted in the said signal and weight indicator housing, gearing means interconnecting the said bell-crank means to the said weight indicating pointer, audible signal means mounted on the said signal and weight indicator housing, a weight indicating pointer mounting pin rotatably mounted in the said signal and weight indicator housing, a hammer mounting collar mounted on the said weight indicating pointer mounting pin and provided with a hammer mounting lug, and a hammer element mounted on the said hammer mounting lug and provided with a bent stop portion resting against the said weight indicating pointer mounting pin, the said weight indicating pointer causing the said hammer to rotate freely by virtue of the momentum imparted thereto by the initial movement of the said weight indicating pointer mounting pin to effectuate an audible signal when contacting the said audible signal means.

2. In trolley line fishing means including fishing line means, a fish signal and weight indicator means comprising, a signal and weight indicator housing having a weight calibrated dial, a weight indicating pointer rotatably mounted to operate associatively with the said calibrated dial, bell-crank means mounted in the said signal and weight indicator housing and provided with a stop portion at one end thereof, gearing means interconnecting the said bell-crank means to the said weight indicating pointer, audible signal means mounted on the said signal and weight indicator housing, a weight indicating pointer mounting pin rotatably mounted in the said signal and weight indicator housing, a hammer mounting collar mounted on the said weight indicating pointer mounting pin and provided with a hammer mounting lug, and a hammer element mounted on the said hammer mounting lug and provided with a bent stop portion resting against the said weight indicating pointer mounting pin, the said weight indicating pointer causing the said hammer to rotate freely by virtue of the momentum imparted thereto by the initial movement of the said weight indicating pointer mounting pin to effectuate an audible signal when contacting the said audible signal means, and adjusting means for setting the said weight indicating pointer mounted within the said signal and weight indicator housing and connected to the stop portion of the said bell-crank means.

3. In trolley line fishing means including fishing line means, a fish signal and weight indicator means comprising, a signal and weight indicator housing having a weight calibrated dial, a weight indicating pointer rotatably mounted to operate associatively with the said calibrated dial, bell-crank means mounted in the said signal and weight indicator housing and provided with a stop portion at one end thereof, and gearing means interconnecting the said bell-crank means to the said weight indicating pointer, audible signal means mounted on the said signal and weight indicator housing, a weight indicating pointer mounting pin rotatably mounted in the said signal and weight indicator housing, a hammer mounting collar mounted on the said weight indicating pointer mounting pin and provided with a hammer mounting lug, and a hammer element mounted on the said hammer mounting lug and provided with a bent stop portion resting against the said weight indicating pointer mounting pin, the said weight indicating pointer causing the said hammer to rotate freely by virtue of the momentum imparted thereto by the initial movement of the said weight indicating pointer mounting pin to effectuate an audible signal when contacting the said audible signal means, and adjusting means for setting the said weight indicating pointer including, screw means slidably confined within the said signal and weight indicator housing, nut adjusting means threadably associated with one end of the said screw means, and spring means interconnecting the other end of the said screw means and the stop portion of the said bell-crank means.

4. In trolley line fishing means including fishing line means, a fish signal and weight indicator means comprising, a signal and weight indicator housing having a weight calibrated dial, a weight indicating pointer rotatably mounted to operate associatively with the said calibrated dial, bell-crank means mounted in the said signal and weight indicator housing and provided with a stop portion at one end thereof, gearing means interconnecting the said bell-crank means to the said weight indicating pointer, audible signal means mounted on the said signal and weight indicator housing, a weight indicating pointer mounting pin rotatably mounted in the said signal and weight indicator housing, a hammer mounting collar mounted on the said weight indicating pointer mounting pin and provided with a hammer mounting lug, and a hammer element mounted on the said hammer mounting lug and provided with a bent stop portion resting against the said weight indicating pointer mounting pin, the said weight indicating pointer causing the said hammer to rotate freely by virtue of the momentum imparted thereto by the initial movement of the said weight indicating pointer mounting pin to effectuate an audible signal when contacting the said audible signal means, and adjusting means for setting the said weight indicating pointer mounted within the said signal and weight indicator housing and connected to the stop portion of the said bell-crank means, the said adjusting means including, screw means slidably confined within the said signal and weight indicator housing, nut adjusting means threadably associated with one end of the said screw means, and spring means interconnecting the other end of the said screw means and the stop portion of the said bell-crank means.

THEODORE E. McAVOY.

REFERENCES CITED

The following references are of record in the file of this patent:

UNITED STATES PATENTS

| Number | Name | Date |
|---|---|---|
| 196,865 | Bellamy | Nov. 6, 1877 |
| 476,940 | Wiss | June 14, 1892 |
| 625,829 | Cook | May 30, 1899 |
| 918,777 | Schwartz | Apr. 20, 1909 |
| 1,360,429 | Michaelis | Nov. 30, 1920 |
| 1,975,385 | Bachus | Oct. 2, 1934 |
| 2,037,232 | Hendriks | Apr. 14, 1936 |
| 2,147,917 | Noren | Feb. 21, 1939 |
| 2,436,459 | Symmes | Feb. 24, 1948 |